US007849453B2

(12) United States Patent
Tirumalai et al.

(10) Patent No.: US 7,849,453 B2
(45) Date of Patent: Dec. 7, 2010

(54) METHOD AND APPARATUS FOR SOFTWARE SCOUTING REGIONS OF A PROGRAM

(75) Inventors: Partha P. Tirumalai, Fremont, CA (US); Yonghong Song, Burlingame, CA (US); Spiros Kalogeropulos, Los Gatos, CA (US)

(73) Assignee: Oracle America, Inc., Redwood Shores, CA (US)

(*) Notice: Subject to any disclaimer, the term of this patent is extended or adjusted under 35 U.S.C. 154(b) by 1016 days.

(21) Appl. No.: 11/272,210

(22) Filed: Nov. 9, 2005

(65) Prior Publication Data

US 2007/0022412 A1  Jan. 25, 2007

Related U.S. Application Data

(63) Continuation-in-part of application No. 11/081,984, filed on Mar. 16, 2005.

(51) Int. Cl.
  *G06F 9/45* (2006.01)
(52) U.S. Cl. ............... 717/160; 717/141; 717/150
(58) Field of Classification Search ........ 717/140–161
  See application file for complete search history.

(56) References Cited

U.S. PATENT DOCUMENTS

| | | | | |
|---|---|---|---|---|
| 5,704,053 | A * | 12/1997 | Santhanam | 717/158 |
| 6,230,317 | B1 * | 5/2001 | Wu | 717/161 |
| 2003/0084433 | A1 * | 5/2003 | Luk et al. | 717/158 |
| 2004/0154019 | A1 * | 8/2004 | Aamodt et al. | 718/102 |
| 2005/0071438 | A1 | 3/2005 | Liao et al. | 709/214 |
| 2005/0086652 | A1 * | 4/2005 | Tian et al. | 717/151 |
| 2005/0149915 | A1 * | 7/2005 | Wu et al. | 717/137 |
| 2006/0048120 | A1 * | 3/2006 | Archambault et al. | 717/160 |

OTHER PUBLICATIONS

Vellanki et al. (a cost-benefit scheme for high performance predictive prefetching, in Proc. ACM/IEEE SC'99, Nov. 1999).*
"Optimizing SMT Processors for High Single-Thread Performance", by Gautham K Dorai et al., Journal of Instruction-Level Parallelism 5, 2003, XP-002348824.

(Continued)

*Primary Examiner*—Lewis A Bullock, Jr.
*Assistant Examiner*—Hang Pan
(74) *Attorney, Agent, or Firm*—Park, Vaughan, Fleming & Dowler LLP; Anthony P. Jones

(57) ABSTRACT

One embodiment of the present invention provides a system that generates code for software scouting the regions of a program. During operation, the system receives source code for a program. The system then compiles the source code. In the first step of the compilation process, the system identifies a first set of loops from a hierarchy of loops in the source code, wherein each loop in the first set of loops contains at least one effective prefetch candidate. Then, from the first set of loops, the system identifies a second set of loops where scout-mode prefetching is profitable. Next, for each loop in the second set of loops, the system produces executable code for a helper-thread which contains a prefetch instruction for each effective prefetch candidate. At runtime the helper-thread is executed in parallel with the main thread in advance of where the main thread is executing to prefetch data items for the main thread.

19 Claims, 10 Drawing Sheets

OTHER PUBLICATIONS

"Design and Implementation of A Compier Framework for Helper Threading on Multi-Core Processors", by Yonghong Song et al., Proceedings of the 14$^{th}$ International Conference4 on Parallel Architectures and Compiliation Techniques, 2005.

"Design and Evaluation of Compiler Algorithms for Pre-Execution", by Dongkeun Kim et al., Proceedings of the Tenth International Conference on Architecural Support for Programming Languages and Operating Systems, Oct. 2002, San Jose, CA, XP-002311601, pp. 159-169.

* cited by examiner

```
/* the overall algorithm */
build loop tree hierarchy.
perform reuse and prefetch analysis.
/* suppose root_loop is the root of the loop tree.*/
call prefetching_using_helper_thread_driver (root_loop).
```

FIG. 2A

```
procedure prefetching_using_helper_thread_driver (Loop *loop)
    if (is_helper_thread_candidate (loop)
        and is_profitable_to_use_helper_thread (loop)) then
            helper_thread_code_gen (loop)
    else
        for (each immediate inner loop of loop, child_loop) do
            prefetching_using_helper_thread_driver (child_loop)
        end for
    end if
end procedure
```

FIG. 2B

```
procedure is_helper_thread_candidate (Loop *loop)
    if (there exists any function calls with side effects in the loop body)
      then
        return FALSE
    end if
    if (the loop is computation bound) then
        return FALSE
    end if
    if (there exists no effective prefetch candidate) then
        return FALSE
    end if
    for (all effective prefetch candidates and conditional branches)
      do
        if (floating-point computation is required directly or indirectly)
          then
            return FALSE
        end if
    end for
    return TRUE
end procedure
```

FIG. 3

```
procedure is_profitable_to_use_helper_thread (Loop *loop)
    p_overhead = startup_cost + parameter_passing_cost
    p_benefit = 0
    for (each effective prefetch candidate in the loop body) do
        m_benefit = num_of_accesses * L2_miss_penalty * predicted_L2_miss_rate
        p_benefit = p_benefit + m_benefit
    end for
If(both p_benefit and p_overhead are known at compile time) then
    if (p_benefit < p_overhead) then
        return FALSE
    else
        return TRUE
    end if
    else
        /* two-version loops will be generated. */
        return TRUE
    end if
end procedure
```

FIG. 4

```
for (t = 0; t <= 1; t = t + 1) {
    if (t == 0) {
        The original loop.
    else {
        The original loop.
    }
}
```

FIG. 5A

```
for (t = 0; t <= I; t = t + 1) {
    if (t == 0) {
        The main thread loop.
    }
    else {
        Scalar renaming assignments.
        The helper thread loop with scalar renaming.
    }
}
```

FIG. 5B

```
is_main_thread_done = FALSE.
#pragma omp parallel for
for (t = 0; t <= I; t = t + 1) {
    if (t == 0) {
        The main thread loop.
        is_main_thread_done = TRUE.
    }
    else {
        if (is_main_thread_done == FALSE) }
            Scalar renaming assignments.
            /* checking is_main_thread_done every certain number of loop iterations. */
            The helper thread loop with scalar renaming.
        }
    }
}
```

FIG. 5C

```
procedure helper_scout_code_gen (Loop *loop)
    /* step 1: generated unsliced helper thread loop */
    make a copy of the original loop and generate code like FIG. 5A.

/* step 2: program slicing and variable renaming for the helper thread loop. */
    for (each effective prefetch candidate in the helper thread loop) do
        mark all statements for its address computation, directly or indirectly, as undeletable.
        turn this load or store to a strong prefetch, and mark it as undeletable.
    end for
    for (every branch in the loop body) do
        mark all statements for branch condition computation, directly or indirectly, as undeletable.
        mark this branch as undeletable.
    end for
    delete all the unmarked deletable statements.
    for (every upward-exposed or downward-exposed variable v in at least one assignment in the helper thread loop) do
        create a temporary variable tv and an assignment tv = v right before the helper thread loop.
        rename all appearances of v with tv in the helper thread loop body.
    end for
    /* The code like FIG. 5B is generated. */

/* step 3: insert checking to prevent helper thread runs behind the main thread. */
    add an assignment right after the main thread loop to indicate that it has completed execution.
    add a check whether the main thread loop has completed execution or not before executing the helper thread loop.
    add checking at every back edge of the helper thread loop and its inner loops to check whether the main thread has done or not.
    make the loop t in FIG. 5C as DOALL loop and perform variable scoping.
end procedure
```

FIG. 6

```
while (p) {
    if (p→data != 0)
        q = p→data;
        while (q) {
            q→data = c;
            q = q→next;
        }
    }
    p = p→next;
}
```

FIG. 7A

```
if (b₁ >= o₁) {
    while (p) {
        q→data = c;
        q = q→next;
        p = p→next;
    }
}
else {
    while (p) {
        if (p→data != 0) {
            q = p→data;
            while (q) {
                q→data = c;
                q = q→next;
            }
        }
        p = p→next;
    }
}
```

FIG. 7B

```
if (b₁ >= o₁) {
    for (t = 0; t <= 1; t++) {
        if (t == 0) {
            while (p) {
                if (p→data != 0) {
                    q = p→data;
                    while (q) {
                        q→data = c;
                        q = q→next;
                    }
                }
                p = p→next;
            }
        }
        else {
            tmp_p = p;
            while (tmp_p) {
                if (tmp_p→data != 0) {
                    q = tmp_p→data;
                    while (q) {
                        prefetch (&(q→data));
                        q = q→next;
                    }
                }
                tmp_p = tmp_p→next;
            }
        }
    }
}
else {
    while (p) {
        p→data = c;
        p = p→next;
    }
}
```

FIG. 7C

```
if (b₂ >= o₂) {
    is_main_thread_done = FALSE;
    #pragma omp parallel for
    for (t = 0; t <= 1; t + +) {
        if (t == 0) {
            while (p) {
                if (p→data != 0)
                    q = p→data;
                    while (q) {
                        q→data = c;
                        q = q→next;
                    }}
                p = p→next;
            }
            is_main_thread_done = TRUE;
        }
        else {
            if (is_main_thread_done == FALSE) {
                tmp_p = p;
                tmp_c = 0;
                while (tmp_p) {
                    if (tmp_p→data != 0)
                        q = tmp_p→data;
                        while (q) {
                            prefetch (&(q→data));
                            q = q→next;
                            if (tmp_c >= check_c) {
                                if (is_main_thread_done == TRUE) {
                                    goto next;
                                }
                                tmp_c = 0;
                            }
                            tmp_c = tmp_c + 1;
                        }}
                    tmp_p = tmp_p→next;
                    if (tmp_c >= check_c) {
                        if (is_main_thread_done == TRUE) {
                            goto next;
                        }
                        tmp_c = 0;
                    }
                    tmp_c = tmp_c + 1;
                }}
            next:
        }}}
else {
    while (p) {
        p→data = c;
        p = p→next;
    }}
```

FIG. 7D

```
procedure ht_main_thread_no_end_sync (void *data)
    LOCK
    if (prev_main_data == NULL) then
        prev_main_data = data
    else if (prev_main_data ≠ prev_helper_data) then
        free (prev_main_data)
        prev_main_data = data
    else
        prev_main_data = data
    end if
    UNLOCK
end procedure
```

FIG. 8A

```
function ht_helper_thread_no_end_sync (void *data)
    LOCK
    if (prev_helper_data ≠ NULL) then
        free (prev_helper_data)
    end if
    if (prev_main_data ≠ data) then
        prev_helper_data = NULL
        should_continue = FALSE
    else
        prev_helper_data = data
        should_continue = TRUE
    end if
    UNLOCK
    return should_continue
end function
```

METHOD AND APPARATUS FOR SOFTWARE SCOUTING REGIONS OF A PROGRAM

RELATED APPLICATION

This application is a continuation-in-part of, and hereby claims priority under 35 U.S.C. §120 to, U.S. patent application Ser. No. 11/081,984, entitled "Method and Apparatus for Generating Efficient Code for a Scout Thread to Prefetch Data Values for a Main Thread," by inventors Partha P. Tirumalai, Yonghong Song, and Spiros Kalogeropulos, filed on 16 Mar. 2005

BACKGROUND

1. Field of the Invention

The present invention relates to techniques for improving computer system performance. More specifically, the present invention relates to a method and an apparatus for generating code for a helper-thread that prefetches data values for a main thread.

2. Related Art

As the gap between processor performance and memory performance continues to grow, prefetching is becoming an increasingly important technique for improving application performance. Currently, prefetching is most effective for memory streams where future memory addresses can be easily predicted. For such memory streams, software prefetching instructions are inserted into the machine code to prefetch data values into cache before the data values are needed. Such a prefetching scheme is referred to as "interleaved prefetching."

Although successful for certain cases, interleaved prefetching tends to be less effective for two types of codes. The first type are codes with complex array subscripts, but with predictable patterns. Such codes often require more computation to determine the addresses of future loads and stores, and hence incur more overhead for prefetching. This overhead becomes even larger if such complex subscripts contain one or more other memory accesses. In this case, prefetches and speculative loads for the memory accesses are both required to form the base address of the prefetch candidate. If the data items targeted for prefetching are already in the cache, such large overhead may actually cause significant execution time regression instead of improving performance. In order to avoid such a penalty, modern production compilers often ignore prefetch candidates with complex subscripts or only prefetch data speculatively one or two cache lines ahead.

The second type of codes for which interleaved prefetching is ineffective are codes which involve pointer-chasing references. For such references, at least one memory address must be retrieved to get the memory address for the next loop iteration. This dependency eliminates the advantage of interleaved prefetching.

Various techniques have been proposed to handle the cases where interleaved prefetching is ineffective. For example, some researchers have proposed using a "jump-pointer" approach (see A. Roth and G. Sohi, Jump-pointer prefetching for linked data structures, *Proceedings of the 26th International Symposium on Computer Architecture*, May 1999.) Unfortunately, the jump-pointer approach requires analysis of the entire program, which may not be available at compile-time.

Other researchers have tried to detect the regularity of the memory stream at compile-time for Java applications (see Brendon Cahoon and Kathryn McKinley, "Data flow analysis for software prefetching linked data structures in Java," *Proceedings of the* 2001 *International Conference on Parallel Architectures and Compilation Techniques*, 2001.)

Yet other researchers have tried to detect the regularity of the memory stream with value profiling (see Youfeng Wu, "Efficient discovery of regular stride patterns in irregular programs and its use in compiler prefetching," *Proceedings of the International Conference on Programming Language Design and Implementation*, June 2002.) This technique requires significant additional steps related to compilation. Furthermore, the technique's accuracy depends on how close training and reference inputs match each other and how many predictable memory streams exist in the program.

Recently developed chip multi-threading (CMT) architectures with shared caches present new opportunities for prefetching. In CMT architectures, the other core (or logical processor) can be used to prefetch data into a shared cache for the main thread.

"Software scout threading" is a technique which performs such prefetching in software. During software scout threading, a scout thread executes in parallel with the main thread. The scout thread does not perform any real computation (except for necessary computations to form prefetchable addresses and to maintain approximately correct control flow), so the scout thread typically executes faster that the main thread. Consequently, the scout thread can prefetch data values into a shared cache for the main thread. (For more details on scout threading, please refer to U.S. Pat. No. 6,415,356, entitled "Method and Apparatus for Using an Assist Processor to Pre-Fetch Data Values for a Primary Processor," by inventors Shailender Chaudhry and Marc Tremblay.)

Software scout threading naturally handles the cases where interleaved prefetching is ineffective. For complex array subscripts, prefetching overhead is migrated to the scout thread. For pointer-chasing codes, software scout threading tries to speculatively load or prefetch values for instructions which actually cause a cache miss.

Unfortunately, software scout threading is not free. The process of launching the scout thread and operations involved in maintaining synchronization between the main thread and the scout thread can create overhead for the main thread. Such overhead must be considered by the compiler as well as the runtime system to determine whether scout threading is worthwhile. Furthermore, existing techniques for scout threading tend to generate redundant prefetches for cache lines that have already been prefetched. These redundant prefetches can degrade system performance during program execution.

Hence, what is needed is a method and an apparatus for reducing the impact of the above-described problems during software scout threading.

SUMMARY

One embodiment of the present invention provides a system that generates code for software scouting the regions of a program. During operation; the system receives source code for a program. The system then compiles the source code. In the first step of the compilation process, the system identifies a first set of loops from a hierarchy of loops in the source code, wherein each loop in the first set of loops contains at least one effective prefetch candidate. Then, from the first set of loops, the system identifies a second set of loops where scout-mode prefetching is profitable. Next, for each loop in the second set of loops, the system produces executable code for a helper-thread which contains a prefetch instruction for each effective prefetch candidate. At runtime the helper-thread is executed in parallel with the main thread in advance of where the main thread is executing to prefetch data items for the main thread.

In a variation on this embodiment, the identifying the first set of loops, involves preferentially identifying high-level loops within the hierarchy of loops, and otherwise identifying lower-level loops within each high-level loop.

In a further variation, identifying the first set of loops involves rejecting loops which include function calls that are not included in a table of known-safe function calls.

In a variation on this embodiment, an instruction is not an effective prefetch candidate when (1) the value loaded by the instruction is used as an address of a future load; (2) the target cache line for the instruction has already been prefetched by a prior instruction; (3) the loop which includes the instruction is computation bound; or (4) the value loaded by the instruction is used to evaluate a conditional statement.

In a variation on this embodiment, identifying a loop where scout-mode prefetching is profitable involves determining if p_benefit≦p_overhead for the loop.

In a further variation, computing p_benefit for a loop involves summing the result of the computation p_benefit=num_accesses*L2_miss_penalty*predicted_L2_miss_rate for each effective prefetch candidate in the loop.

In a further variation, p_overhead=startup_cost+parameter_passing_cost.

In a further variation, num_accesses is either (1) known at compile time; (2) calculated from a loop index; (3) calculated using a profile of the loop; or (4) estimated at compile time.

In a variation on this embodiment, the system produces executable code for a helper-thread with a runtime condition for profitability when a loop cannot be conclusively identified as profitable.

In a further variation, the code for the helper-thread is executed only if the condition for profitability is met at runtime.

In a variation on this embodiment, the executable code for the scout thread and the executable code for the main thread are integrated into the same executable code module.

BRIEF DESCRIPTION OF THE FIGURES

FIG. 2A illustrates a technique for creating a helper-thread in accordance with an embodiment of the present invention.

FIG. 2B illustrates a technique for creating a helper-thread in accordance with an embodiment of the present invention.

FIG. 3 illustrates a technique to select candidate loops for helper-threading in accordance with an embodiment of the present invention.

FIG. 4 illustrates a technique to determine the profitability of a candidate loop for helper-threading in accordance with an embodiment of the present invention.

FIG. 5A illustrates a technique to generate code for a helper-thread in accordance with an embodiment of the present invention.

FIG. 5B illustrates a technique to generate code for a helper-thread in accordance with an embodiment of the present invention.

FIG. 5C illustrates a technique to generate code for a helper-thread in accordance with an embodiment of the present invention.

FIG. 6 illustrates a technique to transform a helper-threading loop to a DOALL loop in accordance with an embodiment of the present invention.

FIG. 7A illustrates an example of code for parallelization in accordance with an embodiment of the present invention.

FIG. 7B illustrates an example of code for parallelization in accordance with an embodiment of the present invention.

FIG. 7C illustrates an example of code for parallelization in accordance with an embodiment of the present invention.

FIG. 7D illustrates an example of code for parallelization in accordance with an embodiment of the present invention.

FIG. 8A illustrates actions taken by the main thread to free shared data in parallel in accordance with an embodiment of the present invention.

FIG. 8B illustrates actions taken by the helper-thread to free shared data in parallel in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs.

A loop is hereby defined as a code structure that iteratively repeats the instructions in a block of code. Many types of instructions, such as a branch instruction, can cause loops.

System

Figure 1A:
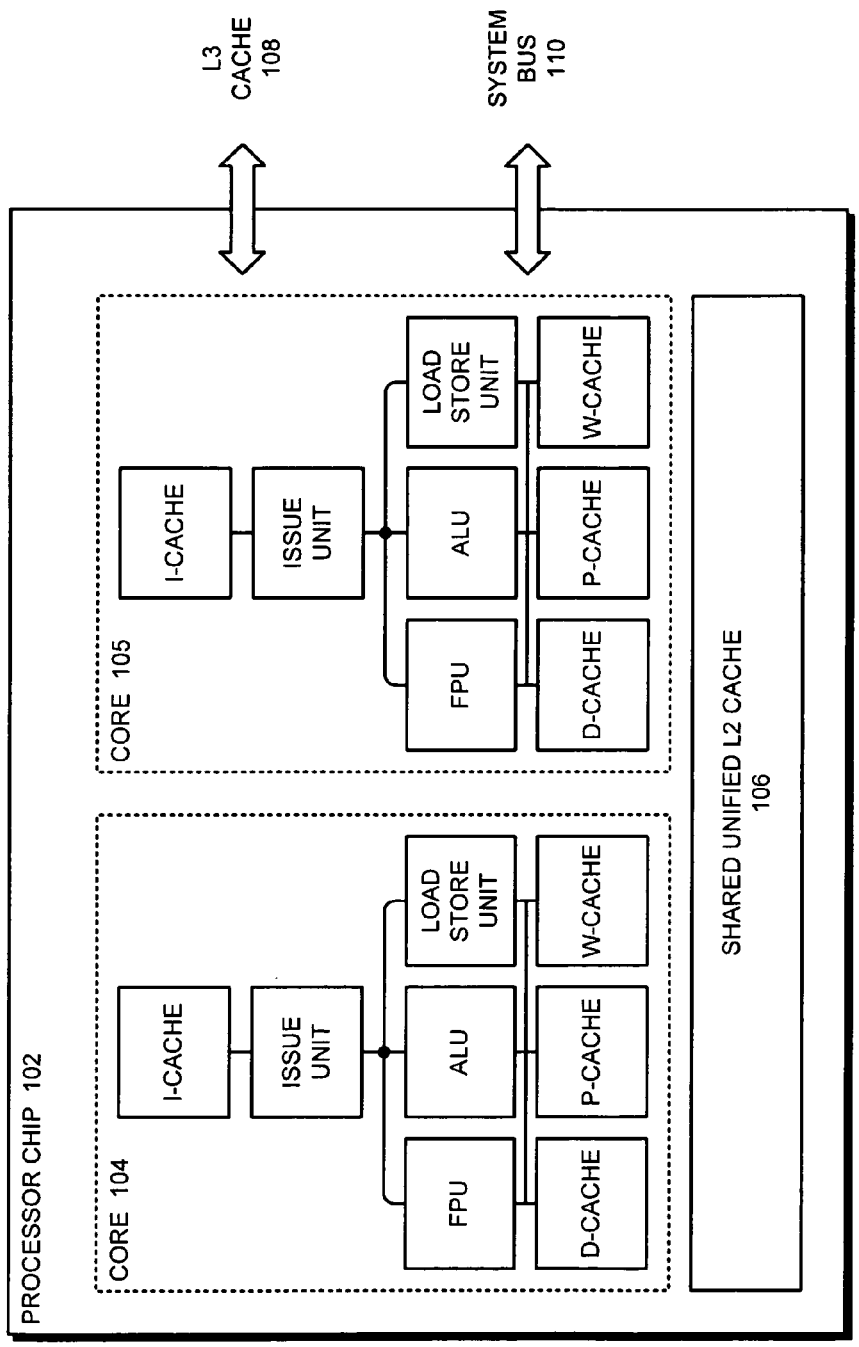
FIG. 1A illustrates a processor system with a chip multithreading (CMT) architecture in accordance with an embodiment of the present invention.

FIG. 1A illustrates a processor system with a chip multithreading (CMT) architecture in accordance with an embodiment of the present invention. In this embodiment, processor chip 102 has two four-issue, in-order, superscalar cores 104-105. Processor chip 102 uses system bus 110 to perform system I/O. Each core 104-105 has its own first level instruction cache and data cache, both of which are 64 kB. Additionally, each core 104-105 also has its own instruction and data translation lookaside buffers (TLBS) (not shown). Cores 104-105 share an on-chip 2 MB level 2 (L2) unified cache 106, which has low latency and adequate bandwidth to support smooth dual core operation. Also shared is a large 32 MB off-chip dirty-victim level 3 (L3) cache 108. L2 cache 106 and L3 cache 108 can be configured to be in split or shared mode. In split mode, each core can allocate only in half the cache. However, each core can read all of the cache. In shared mode, each core can allocate in all of the cache.

One embodiment of the present invention supports a number of variations of software prefetching. These variations include: read-once, read-many, write-once, and write-many. Each of these variations can be either weak or strong. Weak prefetches are dropped if a TLB miss occurs during prefetch address translation. On the other hand, strong prefetches generate a TLB trap, which is then handled before the prefetch is processed. An instruction prefetch is also provided for prefetching instructions. Control circuitry in the processor system further controls the behavior of weak prefetches. These weak prefetches can be dropped if the 8-entry prefetch queue is full, or the processor stalls until a queue slot is available. Latencies to the L1 cache and the L2 cache are 2-3 clocks and 15-16 clocks, respectively.

One embodiment of the present invention allows the main or compute thread to use all prefetch variants. Program analysis and compiler options determine the variants used for prefetchable accesses. Unless otherwise mentioned, the scout thread uses only strong prefetch variants. This is so because the scout thread is expected to run ahead but not do any (unsafe) loads or stores. If prefetches were dropped on a TLB miss in scout-mode, the benefit of scout threading is lost or vastly diminished.

Compilation Process

Figure 1B:
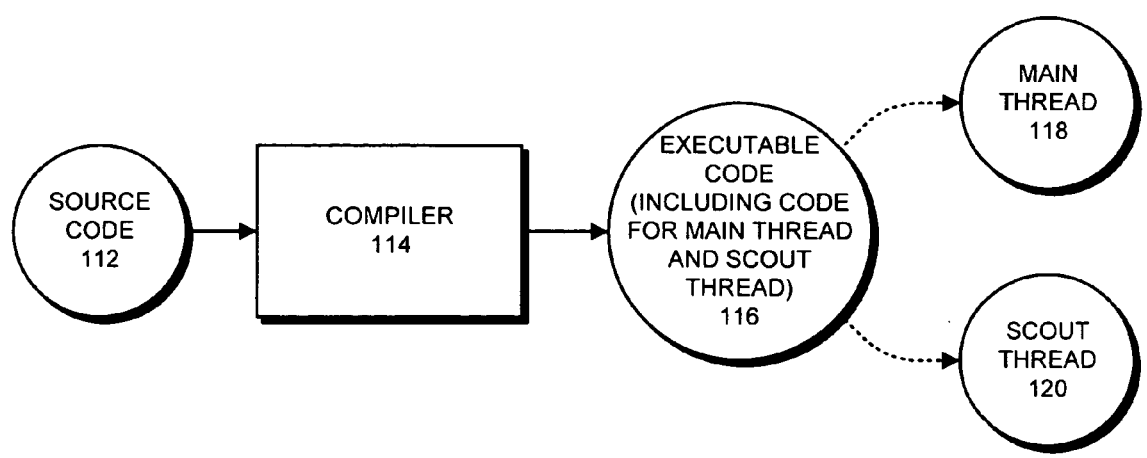
FIG. 1B illustrates how source code is compiled into a single executable code module, which can be executed by both a main thread and a scout thread in accordance with an embodiment of the present invention.

FIG. 1B illustrates how source code 112 is compiled into a single executable code module 116 in accordance with an embodiment of the present invention. In this embodiment, compiler 114 compiles source code 112 into a single executable code module 116, which includes code for both main thread 118 and scout thread 120. This single executable code module can then be executed by both a main thread 118 and a scout thread 120 (as is illustrated by the dashed arrows in FIG. 1B).

Figure 1C:
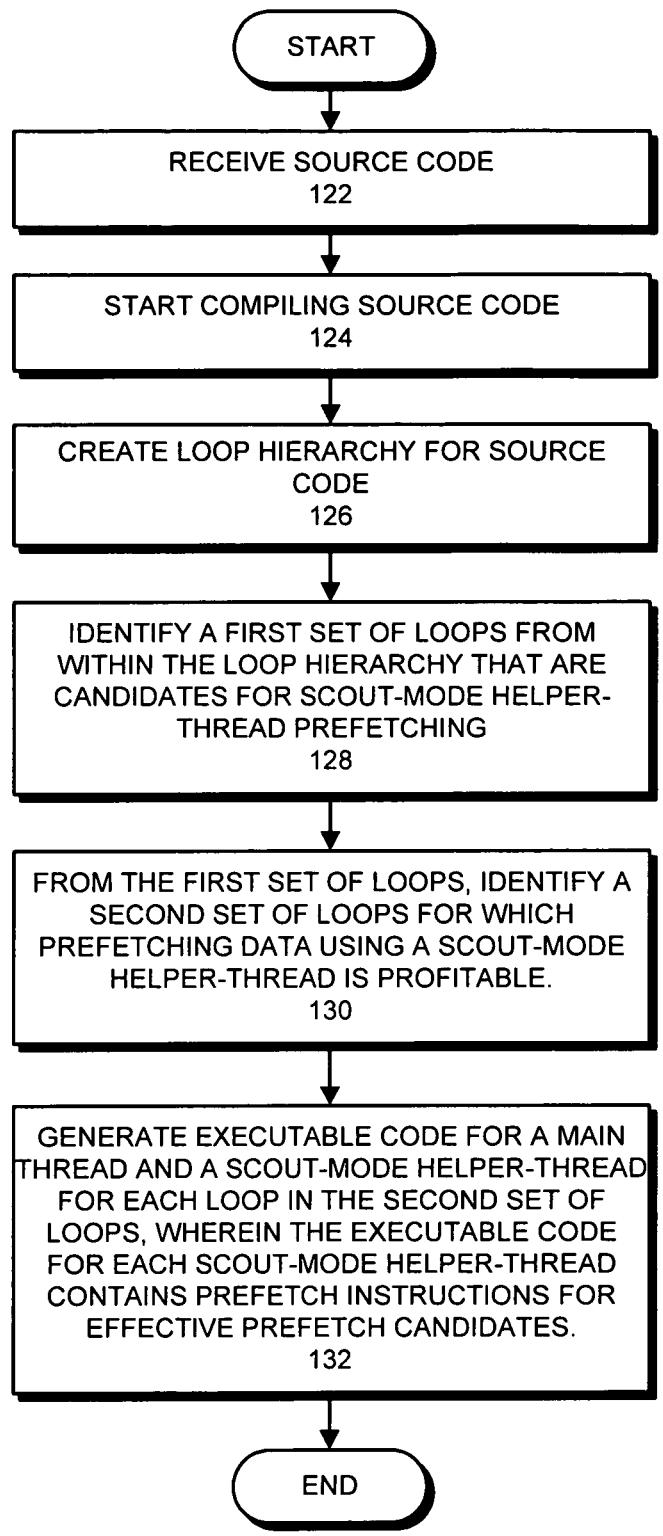
FIG. 1C presents a flow chart illustrating the compilation process in accordance with an embodiment of the present invention.

FIG. 1C presents a flow chart illustrating the compilation process in accordance with an embodiment of the present invention. During this compilation process, the system first receives source code 112 for a program (step 122) and starts compiling source code 112 (step 124).

The system then creates a loop hierarchy for source code 112 (step 126). Within the loop hierarchy, the system records the hierarchical relationship of each loop to the other loops in source code 112.

The system next identifies a first set of loops within the hierarchy that are candidates for helper-threading (step 128). A loop is a candidate for helper-threading when there is at least one effective prefetch candidate within the loop (effective prefetch candidates are instructions which may benefit from prefetching using a helper-thread). During this identification process, the system first attempts to identify loops in the highest level in the hierarchy. If none of these loops is a valid candidate for helper-threading, the system then attempts to identify loops within successively lower levels of the loop hierarchy.

The system then identifies a second set of loops from within the first set of loops for which helper-threading is profitable (step 130). Helper-threading is profitable where the cost of executing a helper-thread is less than the savings generated by prefetching data. The costs of executing a helper-thread include costs such as the cost of starting the helper-thread and the cost of monitoring the progress of the helper-thread relative to the main execution thread.

Finally, the system generates executable code for the main thread and the helper-thread, wherein the executable code for the helper-thread includes prefetch instructions for the identified prefetch candidates (step 132). This compilation process is described in more detail below.

Compiler Support for Helper-Threading

To perform helper-threading, the compiler needs to analyze the program and identify the loop regions which are candidates for helper-threading. During the analysis, the compiler uses the following criteria.

The loop contains memory accesses which may incur cache misses.

The prefetches generated by the helper-thread trigger cache misses sufficiently before the prefetched data are used by the main thread.

Using a helper-thread to generate prefetches for the loop is profitable (the benefit from such prefetching outweighs the cost of using a helper-thread).

FIG. 2A shows the overall technique. Since the current helper-threading is based on loops, a loop hierarchy tree is first built for the loop hierarchy of the whole program. The reuse analysis and prefetch candidate identification are then performed to identify the prefetch candidates. The analysis result is used later to avoid issuing redundant prefetches. The function prefetching_using_a_helper_thread_driver is then called to identify candidates and generate code for helper-threading.

As seen in FIG. 2B, if a loop in the loop hierarchy is identified as a helper-threading candidate where using a helper-thread is profitable, the loop is transformed for helper-threading. Otherwise, the immediate inner loops within this loop are checked.

Due to the dynamic nature of operating system scheduling, the following two issues need to be addressed in code generation.

Ensure the helper-thread does useful work.

Avoid slowdown of the main thread.

The first issue is addressed by checking whether the main thread has already completed the execution of the loop before the helper-thread starts the execution of the corresponding loop. In addition, the helper-thread inquires periodically whether the main thread has completed the execution of the loop.

The second issue is addressed by avoiding synchronization with the helper-thread at the end of the main thread for each particular helper-threading loop. Prefetch instructions are also inserted in the main thread as in the interleaved prefetching mode.

Selecting Candidate Loops

The benefits of using a helper-thread for prefetching to speed up the main thread come from the following.

The helper-thread can have less computations to execute than the main thread. Consequently, the helper-thread can execute certain loads earlier and bring their values to the shared L2 cache.

Certain loads, if their loaded values are not used to compute a branch condition or an address used by another load/store, can be transformed into prefetches in the helper-thread. Furthermore, stores can also be transformed into prefetches. These prefetches can bring data to the shared L2 cache, representing a potentially significant savings in execution time for the main thread. The above load or store is called an "effective prefetch candidate," if the address computation for the load or store depends on at least another load in the same loop body, or the load/store is identified as a prefetch candidate by using reuse analysis.

If the application is "memory-bound" (where the instruction stream has more memory accesses than computations), the first potential benefit is lessened because the loads in both the main thread and the scout thread could be in the critical path of the program. Due to this effect, our scheme selects candidate loops based mainly on the second potential benefit. In the final scout thread code, all effective prefetch candidates are replaced by strong prefetches to their corresponding addresses, in order to realize the potential benefit for the main thread.

Our compiler encodes alias information derived from pointer and array memory accesses in the data flow graph. The data flow graph generated by such alias information may be conservative and limit scout threading scope if the data flow is forced to maintain precise control flow and address computation in the scout thread. To overcome such limitation, while executing, the scout thread periodically checks whether the corresponding loop in the main thread has completed. The compiler ignores conservative data flow edges and their "define-use" chains, when determining effective prefetch candidates and constructing final branch resolution codes. Although this may result in incorrect final prefetch addresses and incorrect control flow, such an omission enables more loops, especially more outer loops, as candidates in pointer-intensive programs. In particular, outer loop candidates tend to greatly increase the potential benefit for scout threading without unnecessarily increasing the cost.

FIG. 3 illustrates a technique to select candidate loops for helper-threading in accordance with an embodiment of the present invention. As illustrated in FIG. 3, loops which contain function calls with side effects are not considered as candidates. Furthermore, computation bound loops (loops with enough computation to hide memory latency) are not considered as candidates. Such an exclusion prevents cases with a heavy-weight main thread and a light-weight scout thread, where the scout thread may run too far ahead and overwrite useful data used in the main thread due to the limited size of the shared L2 cache. In addition, a candidate loop must have at least one effective prefetch candidate to ensure scout threading is potentially beneficial. Finally, the selected effective prefetch candidates and conditionals must not contain floating-point computations, in order to avoid potential floating point exceptions.

Determining Profitability of Candidate Loops

One embodiment of helper-threading uses the existing automatic parallelization infrastructure, which in turn uses a "fork-join" model. When creating the helper-thread, the parallelizable loop is outlined and a runtime library is called to control dispatching the threads, synchronization, etc. This parallelization involves overhead in the runtime library as well as parameter passing overhead due to outlining. The benefit of using a helper-thread comes from the potential cache hit in the main thread for some memory accesses which could be cache misses in a single-threaded run. The compiler analyzes the potential benefit of using a helper-thread versus parallelization overhead to decide the profitability of using a helper-thread for a loop.

FIG. 4 illustrates a technique to determine the profitability of a candidate loop for helper-threading in accordance with an embodiment of the present invention. The overhead of parallelization is computed as the runtime library cost, startup cost, and the cost of passing various shared and first/last private variables, parameter_passing_cost. The startup_cost is a fixed empirical value and the parameter_passing_cost is the cost of passing the value for one variable, which is also a fixed empirical value, multiplied by the number of variables.

The computation of the helper-threading benefit is focused on effective prefetch candidates. For each effective prefetch candidate, the potential saving, p_benefit, is computed as the total number of memory accesses in one invocation of this loop (num_of_accesses), multiplied by the L2 cache miss penalty, L2_miss penalty, multiplied by the potential L2 cache miss rate for this memory access, potential_L2_miss_rate. The L2_miss_penalty is a fixed value given for a specific architecture. In the absence of cache profiling, our approach to determine the potential_L2_miss_rate value for an effective prefetch candidate is based on the complexity of the candidate's address computation and whether a prefetch is available in the main thread. The current values of potential_L2_miss_rate are determined experimentally for different address computation complexity levels. The computation of the number of accesses for an effective prefetch candidate depends on the availability of the profile feedback information. If the profile feedback information is available, the num_of_accesses is computed as the total number of memory accesses for an effective prefetch candidate divided by the times the loop is accessed, as the overhead is computed for each invocation (not each iteration) of the loop. If the profile data shows that the loop is not accessed at all, the value for num_of_accesses is set to 0.

If the profile feedback information is not available, the value of num_of_accesses is computed based on the compile-time information of loop trip counts and branch probability. If the actual trip count is not known at compile-time, our approach is to examine whether the trip count can be computed symbolically through some loop invariants. Otherwise, a trip count is assumed. For conditional statements, equal probability for IF taken/non-taken targets or all case targets of a SWITCH statement is assumed. The total number of accesses, num_of_accesses, is computed based on trip counts and assigned branch probability information.

The total benefit of using a helper-thread for a loop, p_benefit, is the summation of the benefits of all effective prefetch candidates. If p_benefit is greater than p_overhead using compile-time information, the loop is a candidate for helper-threading. Otherwise, if p_benefit is no greater than p_overhead, the loop is not a candidate. Furthermore, if the compile-time information produces inconclusive profitability result with symbolic trip count computation, a two-versioned loop with a runtime condition for profitability p_benefit>p_overhead is generated. At runtime, if the condition is true, the helper-threading version is executed. Otherwise, the original serial version is executed.

Code Generation

Code generation for a candidate loop to use helper-threading involves three phases. In the first phase, code like FIG. 5A is generated. The runtime library has been modified to guarantee that if the loop is parallelized and two threads are available, the main thread executes the branch if is true, and the helper-thread executes the other branch. For example, the ELSE branch loop in FIG. 5A is transformed to form a helper-thread loop. The purpose is to minimize the overhead for the main thread to avoid the main thread slowdown. Note that the helper-thread may still incur overhead warming up the L1 cache and the TLB.

In the second phase, a proper helper-thread loop is generated through program slicing and variable renaming. The helper-thread loop is a sliced original loop containing only the original control flow and necessary statements to compute conditionals and the effective prefetch candidate addresses. All effective prefetch candidates are replaced by strong prefetches to their corresponding addresses. In the helper-thread, all loads are non-faulting loads to avoid exceptions, and all stores are either removed or turned to strong prefetches.

All upward-exposed or downward-exposed assigned variables in the helper-thread loop are renamed, with copy statements of original variables to their corresponding temporary variables placed right before the helper-thread loop. In our scheme, all scalar variables are scoped as private variables including first private, or both first and last private, so that these temporary variables get correct values at runtime. FIG. 5B shows the code after program slicing and variable renaming.

In practice, the helper-thread could run behind the main thread. If this happens, the helper-thread should finish early to avoid doing useless work. In the last phase, the following code is inserted to ensure that the helper-thread is terminated if the helper-thread is running behind the main thread.

Code to indicate that the main thread loop has completed execution immediately after the main thread loop.

Code to check whether the main thread loop has completed execution before executing the helper-thread loop.

Code to check whether the main thread has completed execution after a certain number of helper-thread loop or inner loop iterations.

If any checking reveals that the loop in the main thread has completed execution, the processor halts the helper-thread immediately. FIG. 5C shows the transformed code. The loop in FIG. 5C is marked as a DOALL loop which is later parallelized with the existing automatic parallelization framework.

Variable Scoping

For the parallel loop t in FIG. 5C, the compiler scopes the variables based on the following rules.

All arrays and address-taken scalars are shared.

All non-address-taken scalars (including structure members) are private.

Any scalars upward-exposed to the beginning of loop t are first private.

Any scalars downward-exposed to the end of loop t are both last private and first private. The purpose is to copy out correct value in case that the scalar assignment statement does not execute at runtime.

For any downward exposed variables, the runtime library and outlining code copy out the downward exposed variables in the main thread since all the original computation is done in the main thread. FIG. 6 shows the compiler technique to transform a helper-threading loop candidate to a DO ALL loop.

EXAMPLES

FIGS. 7A-7D illustrate examples in accordance with an embodiment of the present invention. In FIG. 7A, code for a loop whose trip counts cannot be computed at compile-time is illustrated. For the code in FIG. 7A, we also assume that the compiler is not able to guarantee that p→data and p→next access different memory locations at compile-time. If profile feedback data is available, the compiler computes the trip count and branch probabilities based on profile data. Otherwise, the compiler chooses default values for unknown trip counts and branch probabilities.

FIG. 7B illustrates an example of a two-version parallelization transformation. The $b_l$ is the potential benefit for helper-threading and $o_l$ is the parallelization overhead. Both $b_l$ and ol are compile-time constants. Therefore, at compile-time, the branch can be resolved. FIG. 7C shows program slicing and variable renaming. Note that the variable tmp_p is used to copy the original p value.

FIG. 7D shows the codes added to the scout thread for checking if the helper-thread is running behind the main thread. The variable tmp_c is used to count the number of iterations in the helper-thread. The variable check_c, which is a compile-time constant, specifies the number of iterations at which to check whether the main thread has finished or not. Note that all back edges in the helper-thread loop (or the inner loops within the helper-thread loop) are checked. This is necessary in case the innermost loop is rarely executed.

Runtime Support for Helper-Threading

The compiler creates a parallel loop t which spawns the main and helper-threads at runtime (see FIG. 5C). For each helper-threading loop, runtime creates one POSIX thread to represent the helper-thread. This POSIX thread is reused as the helper-thread for subsequent helper-threading loops. Note that the helper-thread shares the same runtime library as automatic/explicit parallelization.

Synchronizing the main thread and the helper-thread at the end of parallel for loop t may unnecessarily slow down the main thread when a helper-thread is running too far behind the main thread. Consequently, in this case, the threads are not synchronized.

Some data (like loop bounds, first private data and shared data, etc.) are passed from the serial portion of the main thread to the runtime library and then to the outlined routine. The outlined routine is then executed by both the main thread and the helper-thread. Such "shared parallel data" is allocated on the heap through the MALLOC routine. The run-time system is responsible for freeing space in the heap to avoid potential out-of-memory issues. The main thread accesses every piece of shared parallel data before the helper-thread accesses the shared parallel data—because the main thread activates the helper-thread. However, the helper-thread may not access every piece of shared data, because certain helper-thread loops can be skipped if the helper-thread is suspended or running behind the main thread.

FIGS. 8A and 8B show the action taken by the main thread and the helper-thread, respectively, to free shared parallel data. The ht_main_thread_no_end_sync and the ht_helper_thread_no_end_sync functions are called at the beginning of the main thread and the helper-thread inside the runtime library, respectively, before delivering control to the outlined routine. The void*data function parameter these functions is the address of the shared parallel data for the current helper-threading loop, while the global variables prev_main_data and prev_helper_data are used to record the previously accessed shared parallel data by the main thread and the helper-thread, respectively. If the future shared parallel data accessed by the helper-thread is not the same one that is currently accessed by the main thread, the helper-thread does not continue the stale helper-threading loop, as indicated by the FALSE return value of should_continue. Note that both functions access the shared data, so a LOCK/UNLOCK pair is placed in both functions to avoid a possible race condition.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for software scouting the regions of a program, comprising:

receiving source code for a program;

compiling the source code to produce executable code for the program, wherein compiling the source code involves:

identifying a first set of loops from a hierarchy of loops in the source code, wherein each loop in the first set of loops contains at least one effective prefetch candidate;

from the first set of loops, identifying a second set of loops where scout-mode prefetching is profitable, wherein identifying a loop where scout-mode prefetching is profitable involves determining if p_benefit≦p_overhead for the loop, wherein computing p_benefit for a loop involves summing the result of the computation p_benefit=num_accesses*L2_miss_penalty*predicted_L2_miss_rate for each effective prefetch candidate in the loop, wherein identifying the second set of loops where scout mode prefetching is profitable includes accounting for a cost in execution time of monitoring progress of the helper-thread relative to the main thread; and for each loop in the second set of loops, producing executable code for the helper-thread by replacing each effective prefetch candidate with a prefetch instruction, whereby at runtime the helper-thread is executed in parallel with the main thread, separately from the main thread, and in advance of where the main thread is executing to prefetch data items for the main thread.

2. The method of claim 1, wherein identifying the first set of loops involves preferentially identifying high-level loops within the hierarchy of loops, and otherwise identifying lower-level loops within each high-level loop.

3. The method of claim 2, wherein identifying the first set of loops involves rejecting loops which include function calls that are not included in a table of function calls.

4. The method of claim 1, wherein an instruction is not an effective prefetch candidate when:
   a value loaded by the instruction is used as an address of a future load;
   a target cache line for the instruction has already been prefetched by a prior instruction;
   the loop which includes the instruction is computation bound; or
   a value loaded by the instruction is used to evaluate a conditional statement.

5. The method of claim 1, wherein p_overhead=startup_cost+parameter_passing_cost.

6. The method of claim 5, wherein num_accesses is:
   known at compile time;
   calculated from a loop index;
   calculated using a profile of the loop; or
   estimated at compile time.

7. The method of claim 1, further comprising producing executable code for a helper-thread with a runtime condition for profitability when a loop cannot be conclusively identified as profitable.

8. The method of claim 7, further comprising executing the helper-thread only if the condition for profitability is met at runtime.

9. A computer-readable storage medium storing instructions that when executed by a computer cause the computer to perform a method for software scouting the regions of a program, the method comprising:
   receiving source code for a program;
   compiling the source code to produce executable code for the program, wherein compiling the source code involves:
   identifying a first set of loops from a hierarchy of loops in the source code, wherein each loop in the first set of loops contains at least one effective prefetch candidate;
   from the first set of loops, identifying a second set of loops where scout-mode prefetching is profitable, wherein identifying a loop where scout-mode prefetching is profitable involves determining if p_benefit≦p_overhead for the loop, wherein computing p_benefit for a loop involves summing the result of the computation p_benefit=num_accesses*L2_miss_penalty*predicted_L2_miss_rate for each effective prefetch candidate in the loop, wherein identifying the second set of loops where scout mode prefetching is profitable includes accounting for a cost in execution time of monitoring progress of the helper-thread relative to the main thread; and
   for each loop in the second set of loops, producing executable code for the helper-thread by replacing each effective prefetch candidate with a prefetch instruction, whereby at runtime the helper-thread is executed in parallel with the main thread, separately from the main thread, and in advance of where the main thread is executing to prefetch data items for the main thread.

10. The computer-readable storage medium of claim 9, wherein identifying the first set of loops involves preferentially identifying high-level loops within the hierarchy of loops, and otherwise identifying lower-level loops within each high-level loop.

11. The computer-readable storage medium of claim 10, wherein identifying the first set of loops involves rejecting loops which include function calls that are not included in a table of function calls.

12. The computer-readable storage medium of claim 9, wherein an instruction is not an effective prefetch candidate when:
   a value loaded by the instruction is used as an address of a future load;
   a target cache line for the instruction has already been prefetched by a prior instruction;
   the loop which includes the instruction is computation bound; or
   a value loaded by the instruction is used to evaluate a conditional statement.

13. The computer-readable storage medium of claim 9, p_overhead=startup_cost+parameter_passing_cost.

14. The computer-readable storage medium of claim 13, wherein num_accesses is:
   known at compile time;
   calculated from a loop index;
   calculated using a profile of the loop; or
   estimated at compile time.

15. The computer-readable storage medium of claim 9, further comprising producing executable code for a helper-thread with a runtime condition for profitability when a loop cannot be conclusively identified as profitable.

16. The computer-readable storage medium of claim 15, further comprising executing the helper-thread only if the condition for profitability is met at runtime.

17. The computer-readable storage medium of claim 9, wherein the executable code for the helper-thread and the executable code for the
   main thread are integrated into the same executable code module.

18. An apparatus for software scouting the regions of a program,
   comprising:
   a processor;
   a memory; and
   a compilation mechanism configured to compile source code for a program;
   said compilation mechanism including a first identification mechanism that is configured to identify a first set of loops from a hierarchy of loops in the source code, wherein each loop in the first set of loops contains at least one effective prefetch candidate; and said compilation mechanism including a second identification mechanism that is configured to identify a second set of loops from within the first set of loops where scout-mode prefetching is profitable, wherein when identifying a loop where scout-mode prefetching is profitable, said second identification mechanism determines if $p\_benefit \leq p\_overhead$ for the loop, wherein when computing p_benefit for a loop, said second identification mechanism sums the result of the computation $p\_benefit = num\_accesses * L2\_miss\_penalty * predicted\_L2\_miss\_rate$ for each effective prefetch candidate in the loop, wherein identifying the second set of loops where scout mode prefetching is profitable includes accounting for a cost in execution time of monitoring progress of the helper-thread relative to the main thread;

wherein, for each loop in the second set of loops, the compilation mechanism is configured to produce executable code for the helper-thread by replacing each effective prefetch candidate with a prefetch instruction, whereby at runtime the helper-thread is executed in parallel with the main thread, separately from the main thread, and in advance of where the main thread is executing to prefetch data items for the main thread.

19. The method of claim 1, wherein the cost in execution time of executing the helper-thread further includes a cost in execution time of starting the helper-thread.

* * * * *